(12) United States Patent
Li et al.

(10) Patent No.: US 6,637,896 B2
(45) Date of Patent: Oct. 28, 2003

(54) COMPACT PROJECTION SYSTEM AND ASSOCIATED DEVICE

(75) Inventors: Zili Li, Barrington, IL (US); Zane Coleman, Atlanta, GA (US); Dmitry Voloschenko, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/003,090

(22) Filed: Oct. 31, 2001

(65) Prior Publication Data

US 2003/0081184 A1 May 1, 2003

(51) Int. Cl.$^7$ ................................................. G03B 21/14
(52) U.S. Cl. .......................................... 353/119; 353/79
(58) Field of Search ............................. 353/119, 79, 72, 353/73, 74, 77, 78

(56) References Cited

U.S. PATENT DOCUMENTS

| | | | |
|---|---|---|---|
| 4,572,632 A | * | 2/1986 | Bodier et al. ................ 353/71 |
| 4,629,299 A | * | 12/1986 | Okano et al. ................ 353/97 |
| 4,640,597 A | * | 2/1987 | Okano et al. ................ 353/79 |
| 4,810,086 A | * | 3/1989 | Tachibana et al. ........... 353/79 |
| 5,048,077 A | | 9/1991 | Wells et al. |
| 5,235,362 A | * | 8/1993 | Kronbauer .................. 353/71 |
| 5,491,507 A | | 2/1996 | Umezawa et al. |
| 5,510,862 A | | 4/1996 | Lieberman et al. |
| 5,568,963 A | | 10/1996 | Bennett et al. |
| 5,642,927 A | | 7/1997 | Booth et al. |
| 5,663,816 A | | 9/1997 | Chen et al. |
| 5,728,998 A | | 3/1998 | Novis et al. |
| 5,867,795 A | | 2/1999 | Novis et al. |
| 5,886,735 A | | 3/1999 | Bullister |
| 5,949,643 A | | 9/1999 | Batio |
| 5,970,418 A | | 10/1999 | Budd et al. |
| 5,986,634 A | | 11/1999 | Alioshin et al. |
| 6,023,254 A | | 2/2000 | Johnson et al. |
| 6,073,033 A | | 6/2000 | Campo |
| 6,073,034 A | | 6/2000 | Jacobsen et al. |
| 6,085,112 A | | 7/2000 | Kleinschmidt et al. |
| 6,179,426 B1 | | 1/2001 | Rodriguez, Jr. et al. |
| 6,184,943 B1 | | 2/2001 | Sellers |
| 6,219,183 B1 | | 4/2001 | Doany |
| 6,334,687 B1 | * | 1/2002 | Chino et al. ................. 353/79 |
| 6,489,934 B1 | | 12/2002 | Klausner |
| 2001/0017604 A1 | | 8/2001 | Jacobsen et al. |

FOREIGN PATENT DOCUMENTS

| | | |
|---|---|---|
| EP | 0 888 005 A2 | 12/1998 |
| WO | WO 02/05518 A2 | 1/2002 |

\* cited by examiner

*Primary Examiner*—William Dowling
(74) *Attorney, Agent, or Firm*—Daniel K. Nichols

(57) ABSTRACT

A compact real-image projection apparatus is used for a portable device (140). An optical projector (110) emits light that is capable of forming an image. A collapsible screen (120) has a collapsed surface area no larger than substantially the surface area of a side of the portable device and an expanded surface area capable of receiving the light emitted from the optical projector (110). A retractable connecting member (150) is coupled between the screen (120) and the optical projector (110) and has at least a stowed position and an extended position. The extended position is configured to hold the screen (120) and the optical projector (110) relative to one another such that the light emitted from the optical projector forms a real image on the screen.

32 Claims, 5 Drawing Sheets

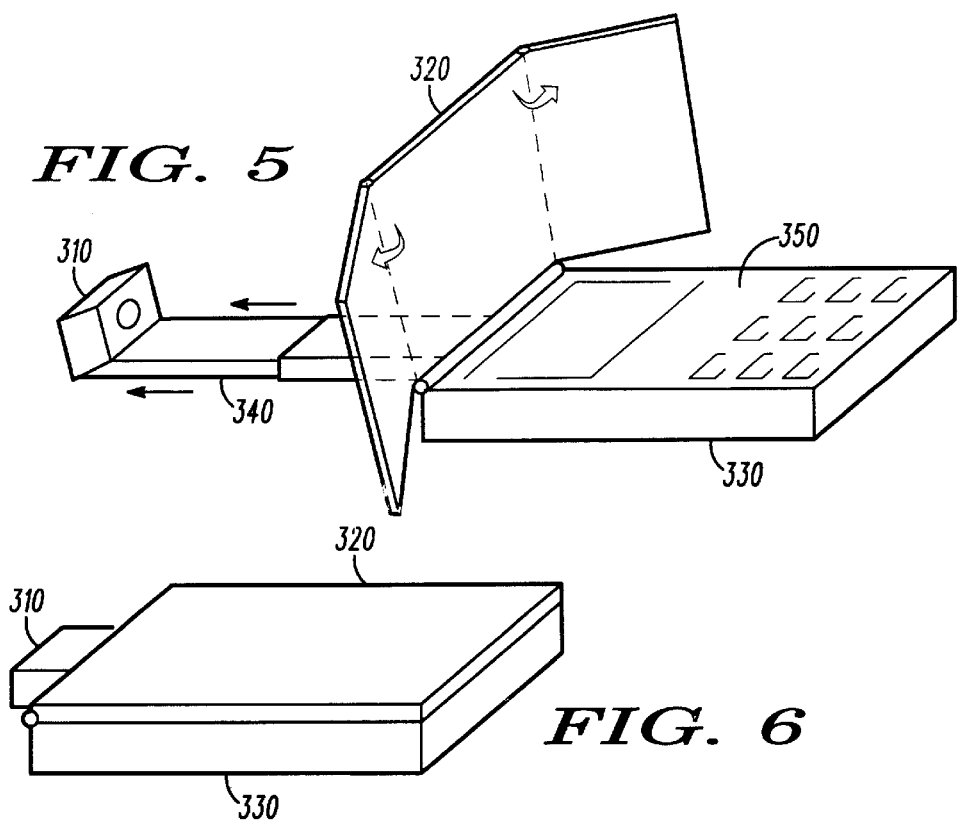
FIG. 5
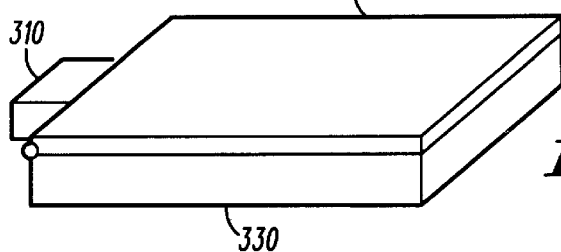
FIG. 6
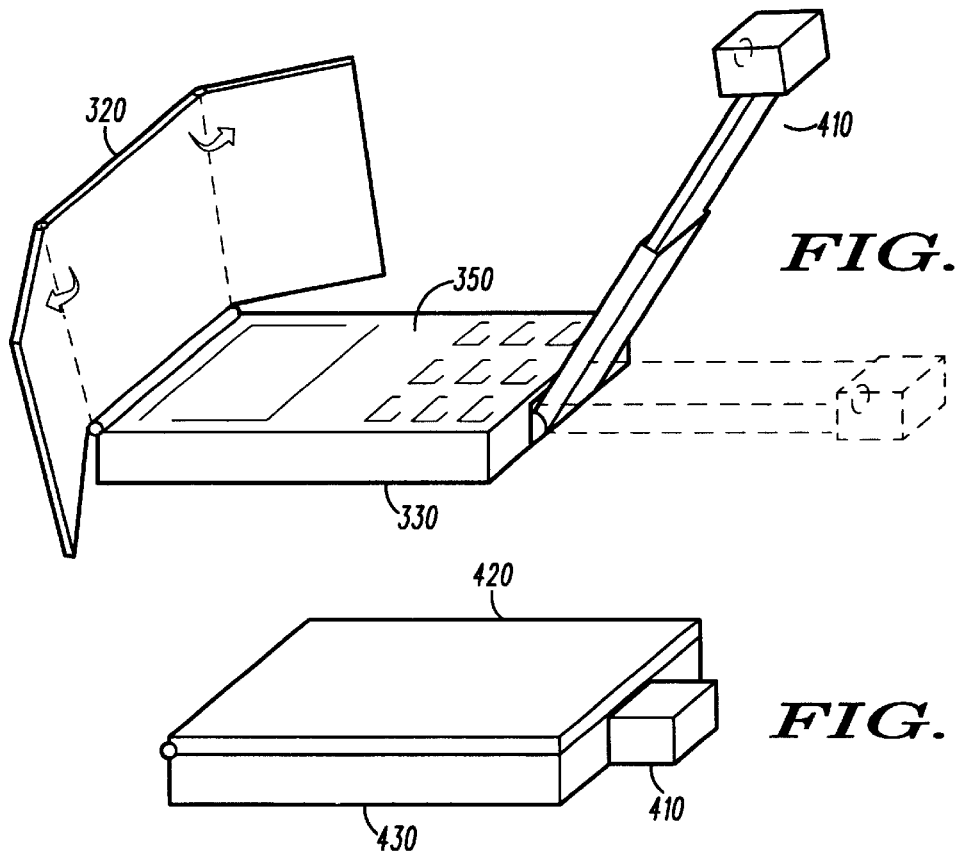
FIG. 7
FIG. 8

COMPACT PROJECTION SYSTEM AND ASSOCIATED DEVICE

BACKGROUND OF THE INVENTION

1. Technical Field

The present invention relates to projection systems and, more particularly, relates to compact projection systems for portable devices.

2. Description of the Related Art

Projectors have been used in rooms to display images for many years. Slide projectors and projection televisions are examples of large-scale projection systems. These projection technologies, however, are unsuitable for compact portable applications.

Miniature optics using a series of lenses and mirrors have been proposed for virtual image viewers on telephones handsets for example, in U.S. Pat. Nos. 6,073,034, 5,867, 795 and 5,048,077. These systems provide a personal image viewable by the telephone user through an eye hole or eye piece. These systems can cause user eyestrain over long periods of time. These systems are incapable of presenting large amounts of screen data at once without scrolling an image. These systems are incapable of use by a group of people such as for demonstration purposes at a meeting.

What is needed is a large screen projection system, for use with a portable electronic device, to present to groups of people or allow large amounts of data to be presented without user eyestrain.

SUMMARY OF THE INVENTION

A compact real-image projection apparatus is used for a portable device. An optical projector emits light capable of forming an image. A collapsible screen has a collapsed surface area no larger than substantially the surface area of a side of the portable device and an expanded surface area capable of receiving the light emitted from the optical projector. A retractable connecting member is coupled between the screen and the optical projector and has at least a stowed position and an extended position. The extended position is configured to hold the screen and the optical projector relative to one another such that the light emitted from the optical projector forms a real image on the screen. The collapsible screen can be unfolding or rolling, for example. In two alternative embodiments, collapsible screen can be either reflective or transmissive for viewing from either the front or the back of the optical projector. The collapsible screen can have multiple layers with a Fresnel surface and be a gain screen that concentrates reflected or transmitted light in a viewing zone.

The details of the preferred embodiments of the invention may be readily understood from the following detailed description when read in conjunction with the accompanying drawings wherein:

BRIEF DESCRIPTION OF THE DRAWINGS

FIG. 5 illustrates a prospective view of a telescoping projector and an unfolding screen embodiment on a portable device in an extended position according to the present invention;

FIG. 6 illustrates a prospective view of a telescoping projector and an unfolding screen embodiment on a portable device in a retracted position according to the present invention;

FIG. 7 illustrates a prospective view of an extensible, rotating projector and an unfolding screen embodiment on a portable device in an extended position according to the present invention;

FIG. 8 illustrates a prospective view of an extensible, rotating projector and an unfolding screen embodiment on a portable device in a retracted position according to the present invention;

DETAILED DESCRIPTION OF THE PREFERRED EMBODIMENTS

Figure 1:
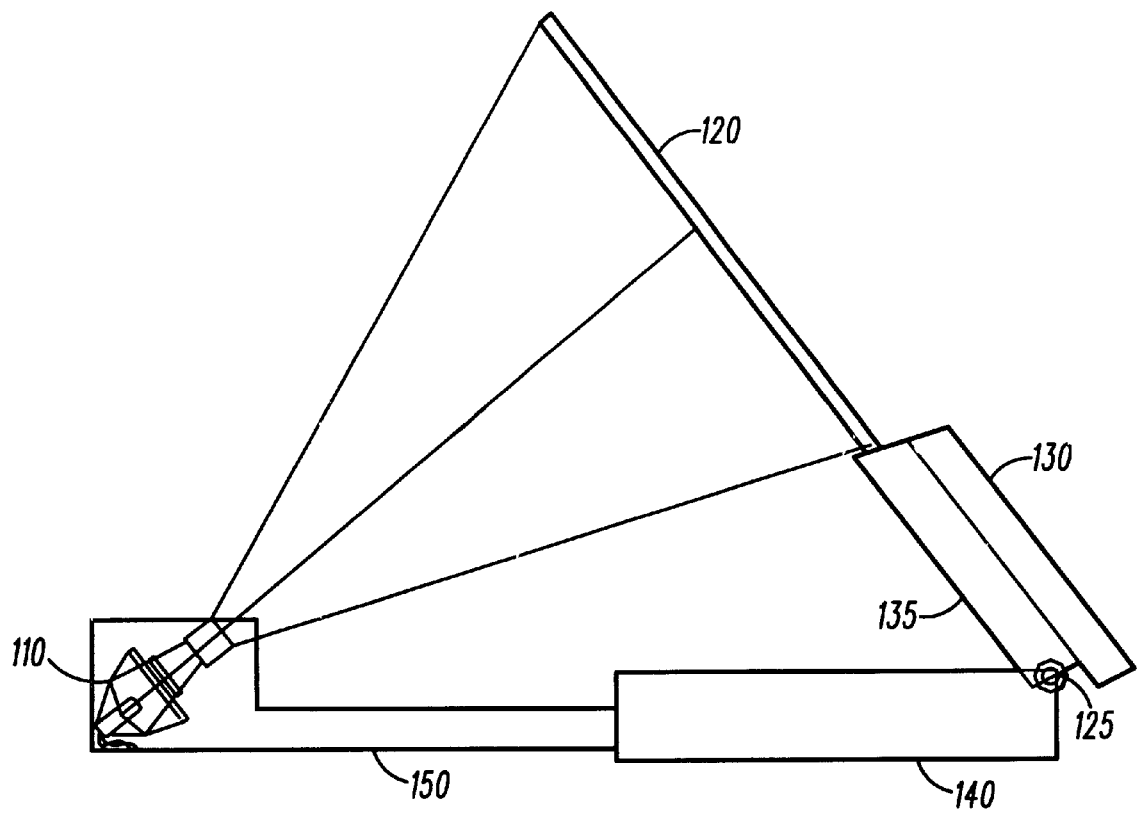
FIG. 1 illustrates a side view of the compact projection system according to one embodiment in an extended position according to the present invention.

FIG. 1 illustrates a side view of the compact projection system according to one embodiment in an extended position according to the present invention. A projector 110 projects light onto a screen 120. The screen 120 is extended out of and pivots upwards on a pivot 125 when in the extended position illustrated in FIG. 1 The screen 120 can be modified to unfold in a horizontal or vertical direction. An outer portion 130 of a pivoting cover 135 slides downwards when extended. The projector 110 is connected to a housing 140 by a retractable connecting member 150. The connecting member 150 is preferably thin such that it does not consume volume of the portable device in the closed position. The connecting member is also preferably thin in the alternate embodiments of this invention for the same reasons.

Figure 2:
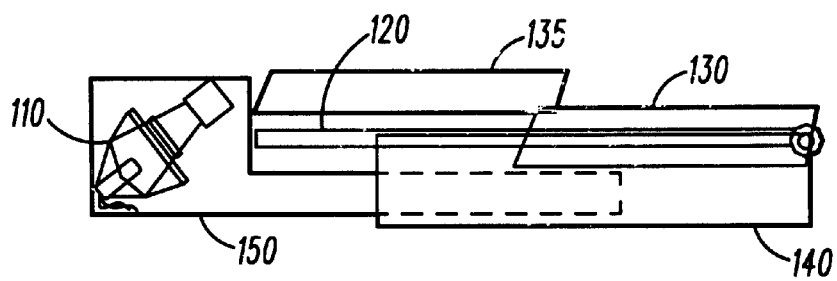
FIG. 2 illustrates a side view of the compact projection system according to the one embodiment in a retracted position according to the present invention.

FIG. 2 illustrates a side view of the compact projection system according to the one embodiment in a retracted position according to the present invention. The retractable member 150 slides into the housing 140 when the compact projection system is in a retracted position. The housing 140 accommodates space for the retracted member 150 inside. The retracted member 150 can be rectangular or tubular in volume or, alternatively, a flat member that does not consume much volume within the housing 140 in a retracted position. The screen 120 folds shut between the housing 140 and an outer portion 130 and the cover 135 when closed in a retracted position. The cover 135 and the outer portion 130 protect the screen from damage in the closed position when the portable device is carried. The housing 140 contains electronics for controlling the projector 110.

Figure 3:
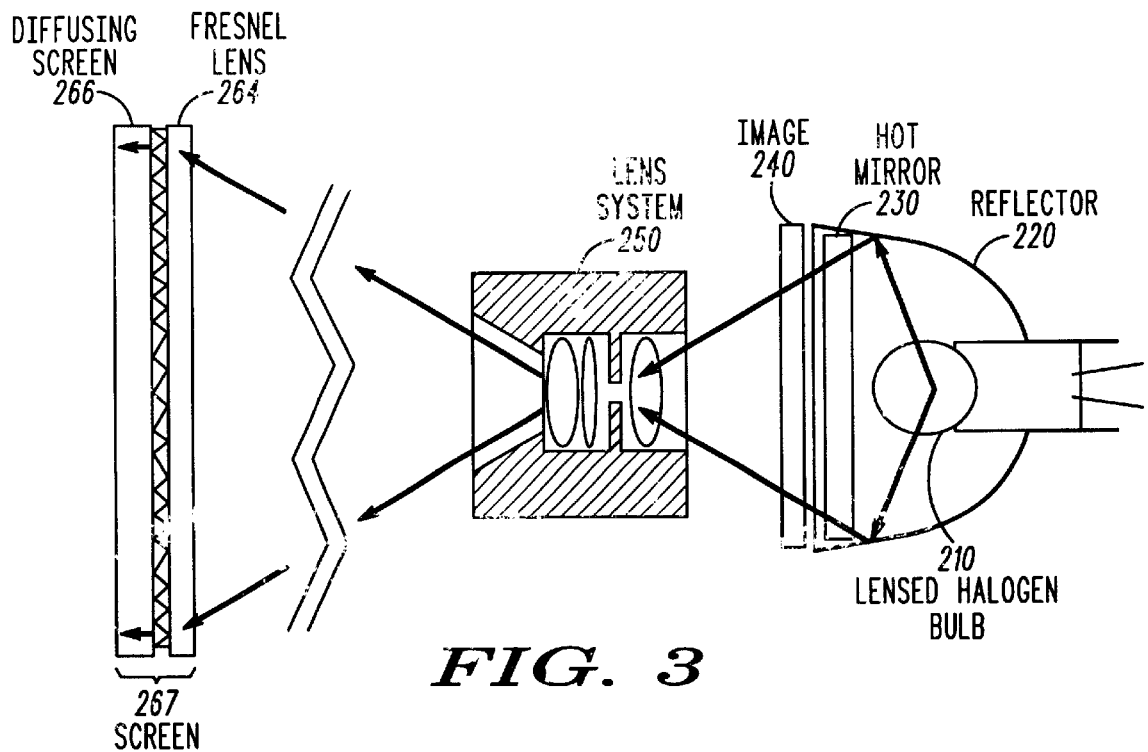
FIG. 3 illustrates a detailed diagram of the internal components for an image projection system according to an example of the present invention.

FIG. 3 illustrates a detailed diagram of the internal components for an image projection system according to an example of the present invention. A lensed halogen bulb 210 provides light reflected by a reflector 220 through a hot mirror 230 and an imager 240 for focusing by a lens system 250 on a screen 260. The imager provides a source of an image for projection on the screen 260. The imager could be a microdisplay driven with the appropriate signal to project temporally changing images on the screen. Alternatively, the microdisplay could be an emissive type such as an Organic Light Emitting Diode (OLED) that would negate the need for a bulb and reflector illuminator. A computer or other controller drives the microdisplay to create desired static or dynamic images. The screen 260 can be either reflective or be transmissive for viewing from either the front or the back of the optical projector. Front projection systems can be designed to have increased contrast over transmission systems by using films such as holograms so that ambient light is not diffracted into the viewing cone and is absorbed behind the films by an absorbing layer. However, with a front projection system the optical projector is located on the viewer side of the device and in some situations could be blocking the view of the display or interaction with the portable device. Rear projection systems require specialized screens that reduce the amount of the unwanted light reaching the viewer. Ambient light typically reduces the contrast of the image in rear projection systems. Typically, light baffles or encasing the system is used in projection systems to reduce this ambient light. For either front or rear projection systems, multiple layer compositions are preferred in a projection screen for a compact device to improve optical characteristics as will be described herein. Front projection systems require reflective screens while rear projection systems require transmissive screens.

Typically, projection screens are diffusers that can be classified as gain or Lambertian. A Lambertian diffuser is one that scatters light equally into a solid angle of 4 pi steradians (half of a sphere). Common screens used for large audiences such as slide projectors or theatres diffuse incident light over a broad range of angles and are close to Lambertian.

A gain screen scatters the incident light non-uniformly. Typically most of the light is diffused into predetermined range of angles centered about the screen normal. Directing light away from some angles and concentrating it into desired angles increases the brightness of the image. The amount of gain for a screen is typically measured by the magnification in intensity of the light relative to a Lambertian diffuser. For example, a 5x gain diffuser would provide an intensity of light 5 times that of a Lambertian diffuser at a specific viewing angle. Gain screens can be used in applications such as handheld devices where the screen is viewed by one or two people within a small range of viewing angles. See U.S. Pat. No. 5,663,816, which is incorporated herein by reference.

A gain screen will conserve battery power for a portable, compact device because the gain screen concentrates light in a predetermined viewing zone. For instance, if a group of persons needs to view the screen, the gain screen can asymmetrically concentrate light in a horizontal but not in a vertical viewing zone thus conserving power for battery operated device. For a personal viewing, a gain screen could be used to concentrate light in both horizontal and vertical directions to conserve power. With some types of diffusers such as surface relief diffusers, the high gain screens may also contribute to problems of speckle in the image. Methods for reducing the speckle introduced with this type of screen can be reduced by continuously moving or vibrating the diffuser. Other methods for reduction in speckle are known to those skilled in the art. Some volumetric diffusers have reduced speckle and may be preferred in some cases. The amount of gain chosen is related to the viewing angles desired, the increase in brightness and image quality desired, the amount of speckle introduced, manufacturing constraints, and cost. The gain screen should have a gain greater than about 5x and preferably greater than about 10x measured within 10 degrees from the normal of the screen.

Typically screens for projection systems may have several layers or components. The screen should contain a diffusing (or scattering) element 266. The diffusive element may be a volumetric scattering film (such as those made by introducing scattering regions of different index of refraction into a film) or surface relief (such as those formed from embossing microstructures as in Physical Optics Corporation Light Shaping Diffusers). Volumetric scattering can also be diffractive in nature such as the case of diffraction from a diffuse hologram.

Projection screens may also have other components such as a Fresnel lens 264 to improve the uniformity, brightness or contrast of the image on the screen. The diffusing structure of the film may direct incident light into a narrow viewing angle, thus providing gain. This may be done symmetrically or asymmetrically (such the case with Physical Optics Corporation Light Shaping Diffusers). In a television projector application, the diffuser may scatter light more horizontally than vertically such that light is not wasted by directing it toward the ceiling. Alternatively, the angular spread of the light can be controlled by adding additional films such as lenticular screens or prismatic films. In order to reduce ambient reflections from the screen, the screen component or support layer may be tinted or specialized diffusing screens 266 such as the BlackScreen™ made by Jenmar Visual Systems may be used to reduced ambient light reflections. In systems where the light reaching the diffusing element arrives from steep angles, typically, a Fresnel lens, such as those manufactured by Fresnel Optics, is used to substantially collimate the incident light. This results in an image where the brightness at the corners of the screen is closer to the brightness at the center of the screen.

Screens for front (reflection) based projectors may also contain multiple different layers. One such screen could consist of a reflection hologram layer laminated onto a black absorptive layer. The reflection hologram could be recorded to be a substantially monochrome diffuse reflection hologram or could contain multiple exposures allowing for polychromatic diffuse reflections such as a red, green and blue reflection for a full-color display Alternatively, multiple layers of holograms could be recorded and laminated together to provide a multicolor reflection for a full-color display. Prismatic films with controlled diffusing layers and a reflective layer can also be used to diffuse light from the projector into a predetermined range of viewing angles. Prismatic films can be designed to tailor the light reflection across the screen to enable off-axis designs and increase the uniformity of the brightness.

In front or in rear screens, any or all of the components may contain anti-reflection layers (such as anti-reflection coatings or moth-eye structures) or anti-glare components to reduce unwanted reflections. The film components comprising the screen could be made substantially thin such that they could be folded or rolled-up into a smaller form factor.

Figure 4:
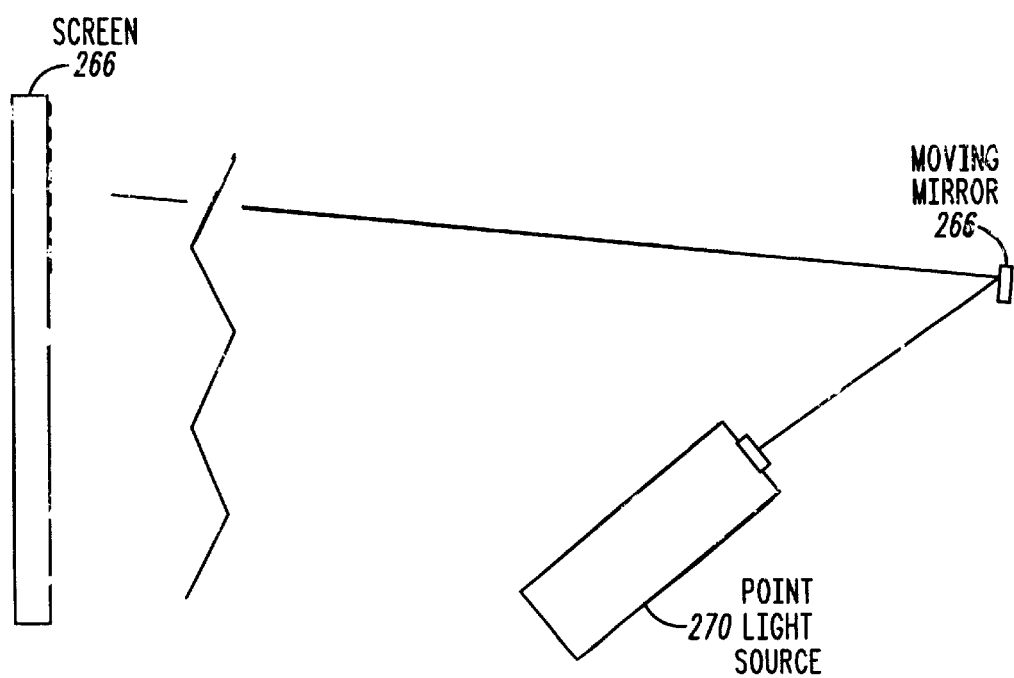
FIG. 4 illustrates a diagram of the internal components for a point light source projection system according to an example of the present invention.

FIG. 4 illustrates a detailed diagram of the internal components for a scanning projection system according to an example of the present invention. Rather than use of an imager to modulate light capable of forming an image, a laser or LED 270 or other point light source and one or more moving mirrors 280 can be used in the embodiment of FIG. 4 to draw an image on the screen 260. Electronics in the housing of the compact device control the point light source 270 and moving mirror 280 to draw the image on the screen 260.

FIGS. 5–15 illustrate various alternative embodiments for constructing the compact projection system of the present invention on the housing of a compact device such as a battery-powered, handheld electronic computer or wireless radio telephone.

FIG. 5 illustrates a prospective view of a telescoping projector 310 and an unfolding screen 320 on a portable device 330 in an extended position and FIG. 6 illustrates a prospective view of the telescoping projector 310 and the unfolding screen 320 on the portable device 330 in a retracted position according to an alternate embodiment of the present invention. The unfolding screen 320 is a transmissive screen viewable from a side opposite the telescoping projector 310. The screen unfolds in a horizontal direction as viewed by the viewer and increases the viewable surface area of the screen. The projector 310 is connected to the portable device 330 by a retractable telescopic member 340. The retractable telescopic member 340 retracts from within the housing or beneath the housing of the portable device 330. The unfolding screen 320 is attached to the portable device 330 using a hinge such that the angle of the screen matches the angle of rotation of the projector 310. In order for proper illumination of the screen, the angle of the screen 320 is not perpendicular to the front face 350 of the housing of the portable device 330 but matched to the angle of illumination from the projector 310. A detent or spring can be used to urge the angle of the screen 320 to an optimum angle that matches the angle of the projector 310.

FIG. 7 illustrates a prospective view of an extensible, rotating projector 410 and an unfolding screen 420 on a portable device 430 in an extended position and FIG. 8 illustrates a prospective view of the extensible, rotating projector 410 and the unfolding screen 420 on the portable device 430 in a retracted position according to an alternate embodiment of the present invention. Phantom lines in FIG. 8 illustrate the projector 410 being extended and rotated from the housing of the portable device 430. The optical projector is rotated upward so that the light is directed toward the screen in a substantially perpendicular direction such that keystone distortion is reduced. This on-axis illumination prevents the projection of a square or rectangular image into a trapezoidal shape.

Figure 9:
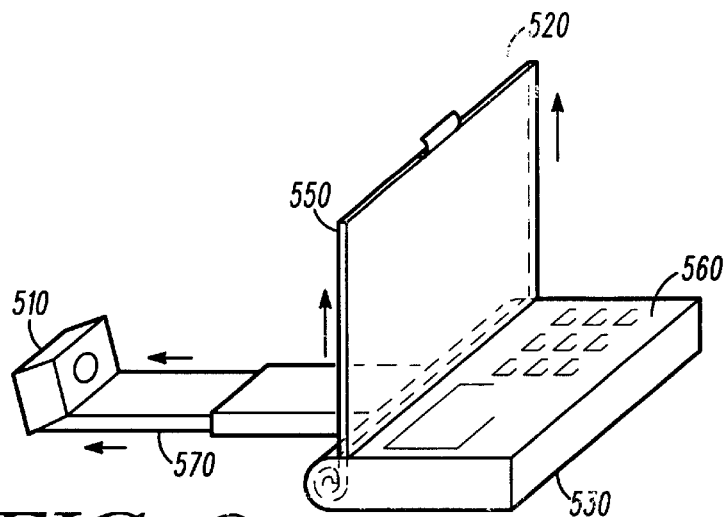
FIG. 9 illustrates a prospective view of an extending projector and a roll-up screen embodiment on a portable device in an extended position according to the present invention.

FIG. 9 illustrates a prospective view of an extending projector 510 and a roll-up screen 520 on a portable device 530 in an extended position according to an alternate embodiment of the present invention. The roll-up screen 520 collapses by automatically rolling in and out under the force of an internal spring and locking mechanism 540. Side ends of the roll-up screen 520 are supported by a roll-out metal band 550 attached to the backside of the screen. The metal band 550 rolls-out similar to a tape measure and thus provides rigidity for the screen when in an extended position. The roll-up screen 520 displays the real image projected from the optical projector 510 in a rear projection format. Alternatively, the screen could be pull-out such that it is substantially co-planar with the front face 560 of the housing of the portable device 530 with the retractable member 570 extending in a direction perpendicular to the screen. The roll-up screen can be substituted for the folding screens used in a front or rear projection format as an alternative to the other collapsing screen approaches in the other embodiments of this invention.

Figure 10:
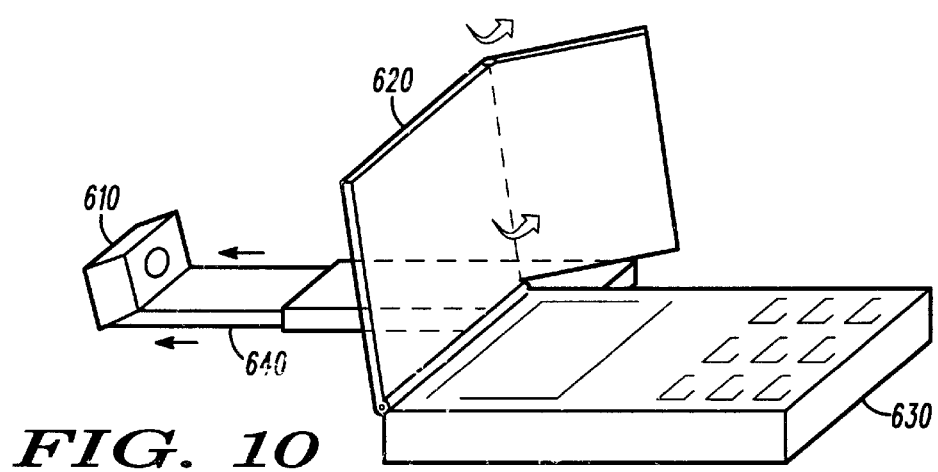
FIG. 10 illustrates a prospective view of a extending projector and an unfolding screen embodiment on a portable device in an extended position according to the present invention.

FIG. 10 illustrates a prospective view of an extending projector 610 and an unfolding screen 620 on a portable device 630 in an extended position according to an alternate embodiment of the present invention. The position of the retractable connecting member 640 is on the side of the portable device 630 such that the projector 610 is centrally located to projection light perpendicular to the screen 620.

Figure 11:
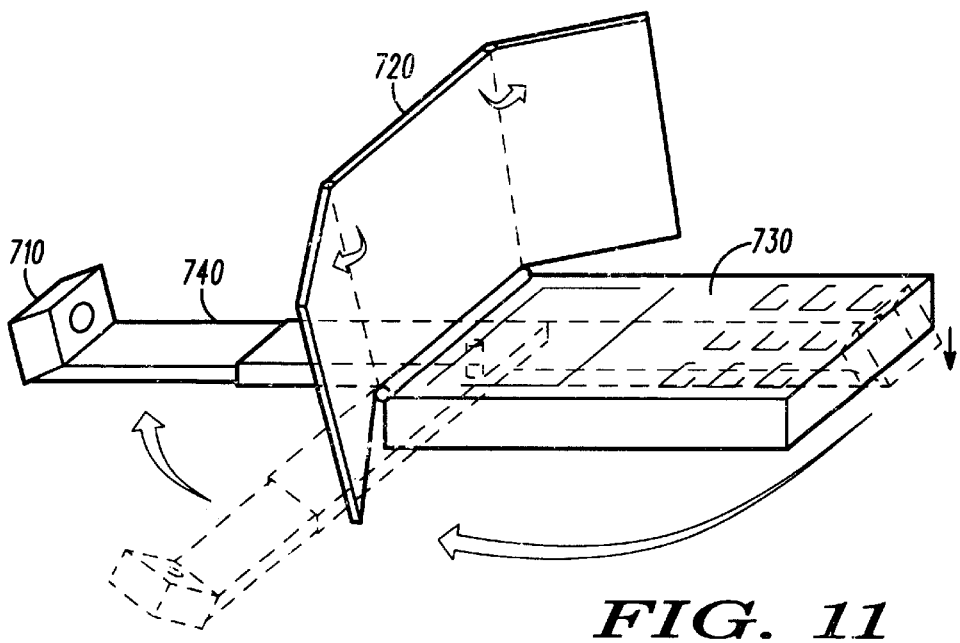
FIG. 11 illustrates a prospective view of an axially rotating projector and an unfolding screen embodiment on a portable device in an extended position according to the present invention.

FIG. 11 illustrates a prospective view of an axially rotating projector 710 and an unfolding screen 720 on a portable device 730 in an extended position and in phantom lines being closed to a retracted position according to an alternate embodiment of the present invention. The retractable connecting member 740 is stored in a recess on the bottom surface of the housing of the portable device 730. To extend the retractable connecting member 740, it is axially pulled out of the recess before rotating.

Figure 12:
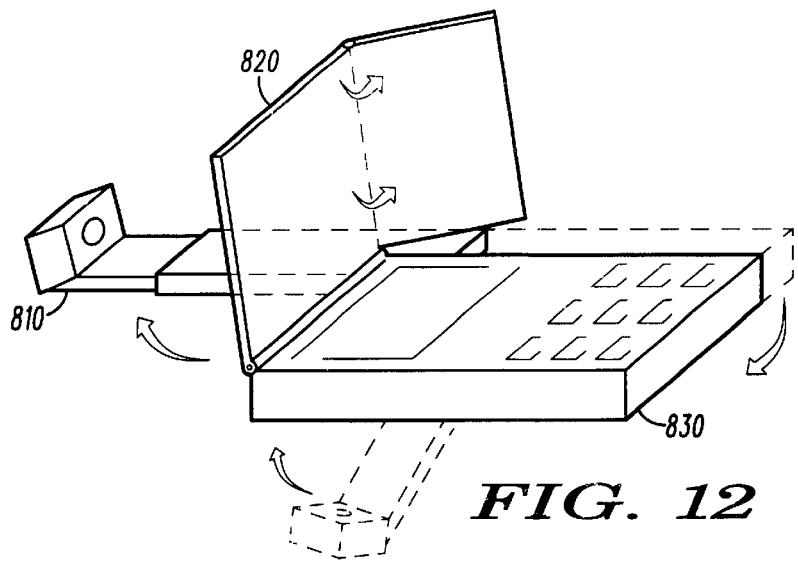
FIG. 12 illustrates a prospective view of a radially rotating projector and an unfolding screen embodiment on a portable device in an extended position according to the present invention.

FIG. 12 illustrates a prospective view of a radially rotating projector 810 and an unfolding screen 820 on a portable device 830 in an extended position according to an alternate embodiment of the present invention.

Figure 13:
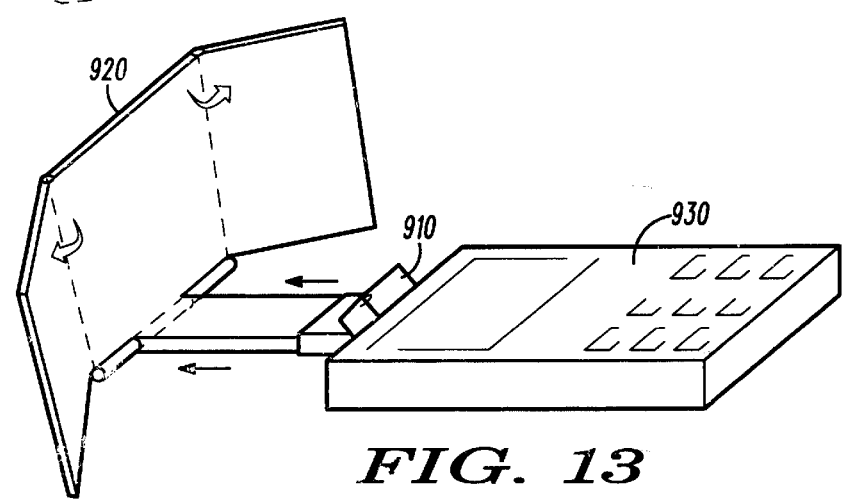
FIG. 13 illustrates a prospective view of an extending, folding screen embodiment for a projector on a portable device in an extended position according to the present invention.

FIG. 13 illustrates a prospective view of an extending, folding screen 920 for a projector 910 on the near end of the portable device 930 relative to the screen in an extended position according an alternate embodiment of to the present invention. The extending, folding screen 920 pulls out from the portable device 930.

Figure 14:
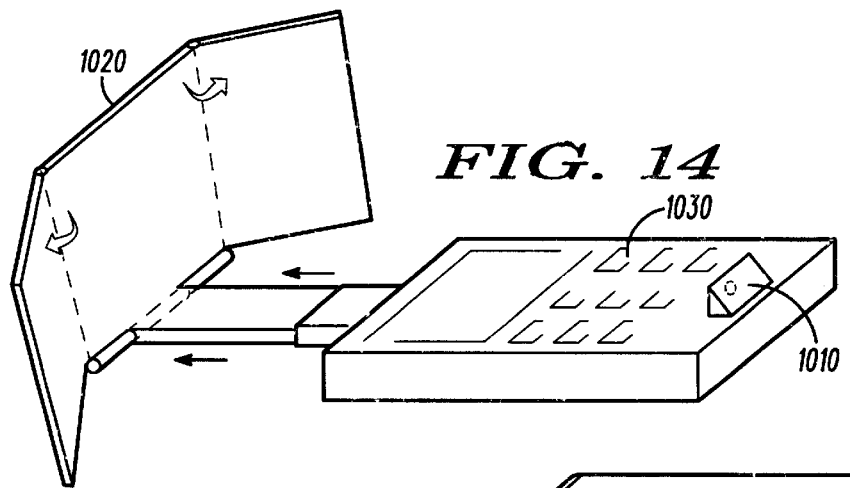
FIG. 14 illustrates a prospective view of a different extending, folding screen embodiment for a projector on a portable device in an extended position according to the present invention.
Figure 15:
FIG. 15 illustrates a prospective view of a different extending, folding screen embodiment for a projector on a portable device in a retracted position according to the present invention.

FIG. 14 illustrates a prospective view of an extending, folding screen 1020 for a different projector 1010 on the far end of the portable device 1030 relative to the screen in an extended position and FIG. 15 illustrates a prospective view of the extending, folding screen 1020 for a different projector 1010 on the portable device 1030 in a retracted position according to an alternate embodiment of to the present invention. The projector 1010 may be in-between the ends to give the greatest throw distance for the projector with the users fingers on buttons blocking the projection.

Although the invention has been described and illustrated in the above description and drawings, it is understood that this description is by example only, and that numerous changes and modifications can be made by those skilled in the art without departing from the true spirit and scope of the invention. Although the examples in the drawings depict only example constructions and embodiments, alternate embodiments are available given the teachings of the present patent disclosure. For example the portable device could be miniature or of other electronic kind (such as a personal data assistant or electronic game) or the projector and screen could be located on alternate locations and surfaces of the device housing. The projection apparatus describe herein could function as an accessory to a portable electronic device. The drawings are for illustrative purposes and although relative sizes can be seen among the elements, they are not drawn to scale.

What is claimed is:

1. A compact real-image projection apparatus for a portable device, comprising:
   an optical projector for emitting light capable of forming an image;
   a collapsible screen having a collapsed surface area no larger than substantially the surface area of a side of the portable device and an expanded surface area capable of receiving the light emitted from the optical projector, the collapsible screen has an expanded surface area larger than a single surface of the portable device; and
   a retractable connecting member coupled to the screen and the optical projector having at least a stowed position and an extended position, the extended position configured to hold the screen and the optical projector relative to one another such that the light emitted from the optical projector forms a real image on the screen.

2. An apparatus according to claim 1, wherein the collapsible screen comprises at least two unfolding sections.

3. An apparatus according to claim 1, wherein the collapsible screen is rolling.

4. An apparatus according to claim 3, wherein the collapsible screen rolls automatically by spring and locking mechanism.

5. An apparatus according to claim 1, wherein the collapsible screen is reflective.

6. An apparatus according to claim 1, wherein the collapsible screen is transmissive.

7. An apparatus according to claim 6, wherein the collapsible screen comprises multiple layers and at least one of the multiple layers of the collapsible screen comprises a Fresnel lens.

8. An apparatus according to claim 1, wherein the optical projector comprises an imager to create the image.

9. An apparatus according to claim 1, wherein the optical projector comprises at least one source for creating the image using a moving point light beam.

10. An apparatus according to claim 1, wherein the collapsible screen comprises multiple layers.

11. An apparatus according to claim 1, wherein the collapsible screen comprises a gain screen that concentrates light in at least one predetermined viewing zone.

12. An apparatus according to claim 11, wherein the gain screen concentrates light asymmetrically in a substantially horizontal viewing zone.

13. An apparatus according to claim 11, wherein the gain screen has a gain greater than 5× measured within 10 degrees from a normal to the screen.

14. An apparatus according to claim 1, wherein the collapsible screen is substantially planer.

15. An apparatus according to claim 1, wherein the retractable connecting member disposes by pulling out or sliding or telescoping or rotating out.

16. An apparatus according to claim 1, wherein the retractable connecting member extends and retracts in an axial direction relative to a path of the light.

17. An apparatus according to claim 1, wherein the retractable connecting member extends and retracts in a radial direction relative to a path of the light.

18. An apparatus according to claim 1, wherein the retractable connecting member fixedly locks in a extended position between the screen and the optical projector.

19. A portable device having a compact real-image projector comprising:
   a portable device with a housing;
   an optical projector for emitting light capable of forming an image;
   a collapsible screen having a collapsed surface area no larger than substantially the surface area of a side of the portable device and an expanded surface area capable of receiving the light emitted from the optical projector, the collapsible screen has an expanded surface area larger than a single surface of the portable device; and
   a retractable connecting member disposed on the housing of die portable device between at least one of the screen and the optical projector and having at least a stowed position and an extended position, the extended position configured to hold the screen and the optical projector relative to one another such that the light emitted from the optical projector forms a real image on the screen.

20. A portable device according to claim 19, wherein the collapsible screen comprises at least two unfolding sections.

21. A portable device according to claim 19, wherein the collapsible screen is rolling.

22. A portable device according to claim 19, wherein the collapsible screen is reflective.

23. A portable device according to claim 19, wherein the collapsible screen is transmissive.

24. A portable device according to claim 19, wherein the collapsible screen comprises a gain screen that concentrates light in at least one predetermined viewing zone.

25. A portable device according to claim 24, wherein the gain screen concentrates light asymmetrically in a substantially horizontal viewing zone.

26. A portable device according to claim 19, wherein the housing contains a radio telephone.

27. A compact real-image projection apparatus for a portable device, comprising:
   an optical projector for emitting light capable of forming an image;
   a collapsible screen having a collapsed surface area no larger than substantially the surface area of a side of the portable device and an expanded surface area capable of receiving the light emitted from the optical projector, the collapsible screen comprises at least two unfolding sections; and
   a retractable connecting member coupled to the screen and the optical projector having at least a stowed position and an extended position, the extended position configured to hold the screen and the optical projector relative to one another such that the light emitted from the optical projector forms a real image on the screen.

28. A compact real-image projection apparatus for a portable device, comprising:
   an optical projector for emitting light capable of forming an image;
   a collapsible screen having a collapsed surface area no larger than substantially the surface area of a side of the portable device and an expanded surface area capable of receiving the light emitted from the optical projector, the collapsible screen is rolling; and
   a retractable connecting member coupled to the screen and the optical projector having at least a stowed position and an extended position, the extended position configured to hold the screen and the optical projector relative to one another such that the light emitted from the optical projector forms a real image on the screen.

29. An apparatus according to claim 28, wherein the collapsible screen rolls automatically by spring and locking mechanism.

30. A compact real-image projection apparatus for a portable device, comprising:
   an optical projector for emitting light capable of forming an image;
   a collapsible screen having a collapsed surface area no larger than substantially the surface area of a side of the portable device arid an expanded surface area capable of receiving the light emitted from the optical projector, the collapsible screen is reflective; and
   a retractable connecting member coupled to the screen and the optical projector having at least a stowed position and an extended position, the extended position configured to hold the screen and the optical projector relative to one another such that the light emitted from the optical projector forms a real image on the screen.

31. A portable device having a compact real-image projector, comprising:
   a portable device with a housing;
   an optical projector for emitting light capable of forming an image;
   a collapsible screen having a collapsed surface area no larger than substantially the surface area of a side of the portable device and an expanded surface area capable of receiving the light emitted from the optical projector, the collapsible screen comprises at least two unfolding sections; and
   a retractable connecting member disposed on the housing of the portable device between at least one of the screen and the optical projector and having at least a stowed position and an extended position, the extended position configured to hold the screen and the optical projector relative to one another such that the light emitted from the optical projector forms a real image on the screen.

32. A portable device having a compact real-image projector, comprising:

a portable device with a housing;

an optical projector for emitting light capable of forming an image;

a collapsible screen having a collapsed surface area no larger than substantially the surface area of a side of the portable device and an expanded surface area capable of receiving the light emitted from the optical projector, the collapsible screen is rolling; and a retractable connecting member disposed on the housing of the portable device between at least one of the screen and the optical projector and having at least a stowed position and an extended position, the extended position configured to hold the screen and the optical projector relative to one another such that the light emitted from the optical projector forms a real image on the screen.

* * * * *